United States Patent
Heinz

(10) Patent No.: US 11,248,934 B2
(45) Date of Patent: Feb. 15, 2022

(54) MULTIPLE POSITION DETECTION USING AN INHOMOGENEOUSLY VARYING MAGNETIC FIELD

(71) Applicant: Infineon Technologies AG, Neubiberg (DE)

(72) Inventor: Richard Heinz, Munich (DE)

(73) Assignee: Infineon Technologies AG

( * ) Notice: Subject to any disclaimer, the term of this patent is extended or adjusted under 35 U.S.C. 154(b) by 60 days.

(21) Appl. No.: 16/801,523

(22) Filed: Feb. 26, 2020

(65) Prior Publication Data
US 2021/0262832 A1 Aug. 26, 2021

(51) Int. Cl.
*G01D 5/14* (2006.01)

(52) U.S. Cl.
CPC .................. *G01D 5/145* (2013.01)

(58) Field of Classification Search
CPC ...................................................... G01D 5/145
See application file for complete search history.

(56) References Cited

U.S. PATENT DOCUMENTS

2015/0377648 A1* 12/2015 Sirohiwala ............. G01D 5/165
324/207.2
2019/0383644 A1* 12/2019 Marauska ................ G01B 7/30

* cited by examiner

*Primary Examiner* — Clayton E. LaBalle
*Assistant Examiner* — Michael A Harrison
(74) *Attorney, Agent, or Firm* — Design IP

(57) ABSTRACT

A magnetic sensor device includes a three-dimensional (3D) magnetic sensor and a magnet that produces a magnetic field. The 3D magnetic sensor is arranged within the magnetic field and is configured to measure three different magnetic field components of the magnetic field and generate sensor signals in response to the measured three different magnetic field components. The magnet is arranged in a default spatial position in an absence of any applied spatial force, where the magnet is configured to rotate about a rotation axis based on an applied rotational force. The magnetic field varies inhomogeneously with regards to at least one of the three magnetic field components upon rotation of the magnet about the rotation axis.

29 Claims, 6 Drawing Sheets

MULTIPLE POSITION DETECTION USING AN INHOMOGENEOUSLY VARYING MAGNETIC FIELD

FIELD

The present disclosure relates generally to three-dimensional (3D) magnetic sensors in combination with a magnet.

BACKGROUND

Input devices such as rotary knobs may be used to control many different functionalities and therefore introduces a complex movement detection problem. A specific example is a volume control knob of a vehicle multimedia system. Such a knob could have the following advanced functionality: rotation for volume control (without end stop); push for mute or power on/off; and tilt up or down to change a current mode, radio station, or song played. Thus, the knob can be moved in any combination of the given positions but requires an unambiguous detection of the movement for a proper control.

Current implementations typically require a combination of several sensing elements, which could include: a mechanical switch for push detection; two mechanical switches for tilt detection; and magnetic, optical, mechanical, or resistive sensing elements for the rotation detection. The number of sensing elements used to unambiguous detect different movements of the knob introduces higher costs and design complexity. Thus, a simpler, most cost effective solution may be desirable.

SUMMARY

Embodiments are directed to using a single three-dimensional (3D) magnetic sensor for position detection of multidirectional rotary object that is configured to move between different three-dimensional positions, as well as move rotationally.

According to one or more embodiments, a magnetic sensor device includes a 3D magnetic sensor arranged within a magnetic field, the 3D magnetic sensor being configured to measure three different magnetic field components of the magnetic field and generate sensor signals in response to the measured three different magnetic field components; and a magnet that produces the magnetic field. The magnet is arranged in a default spatial position in an absence of any applied spatial force and the magnet is configured to rotate about a rotation axis based on an applied rotational force. The magnetic field varies inhomogeneously with regards to at least one of the three magnetic field components upon rotation of the magnet about the rotation axis.

According to one or more embodiments, a rotary knob sensor arrangement includes a rotary knob comprising a shaft configured to rotate about a rotation axis; a 3D magnetic sensor arranged within a magnetic field, the 3D magnetic sensor being configured to measure three different magnetic field components of the magnetic field and generate sensor signals in response to the measured three different magnetic field components; and a magnet coupled to the shaft and configured to produce the magnetic field. The magnet is arranged in a default spatial position in an absence of any spatial force applied to the rotary knob. The magnet is configured to rotate about a rotation axis based on a rotational force applied to the rotary knob. The magnetic field varies inhomogeneously at the 3D magnetic sensor with regards to at least one of the three magnetic field components while the magnet rotates about the rotation axis.

BRIEF DESCRIPTION OF THE DRAWINGS

Embodiments are described herein making reference to the appended drawings.

DETAILED DESCRIPTION

Figure 1A:
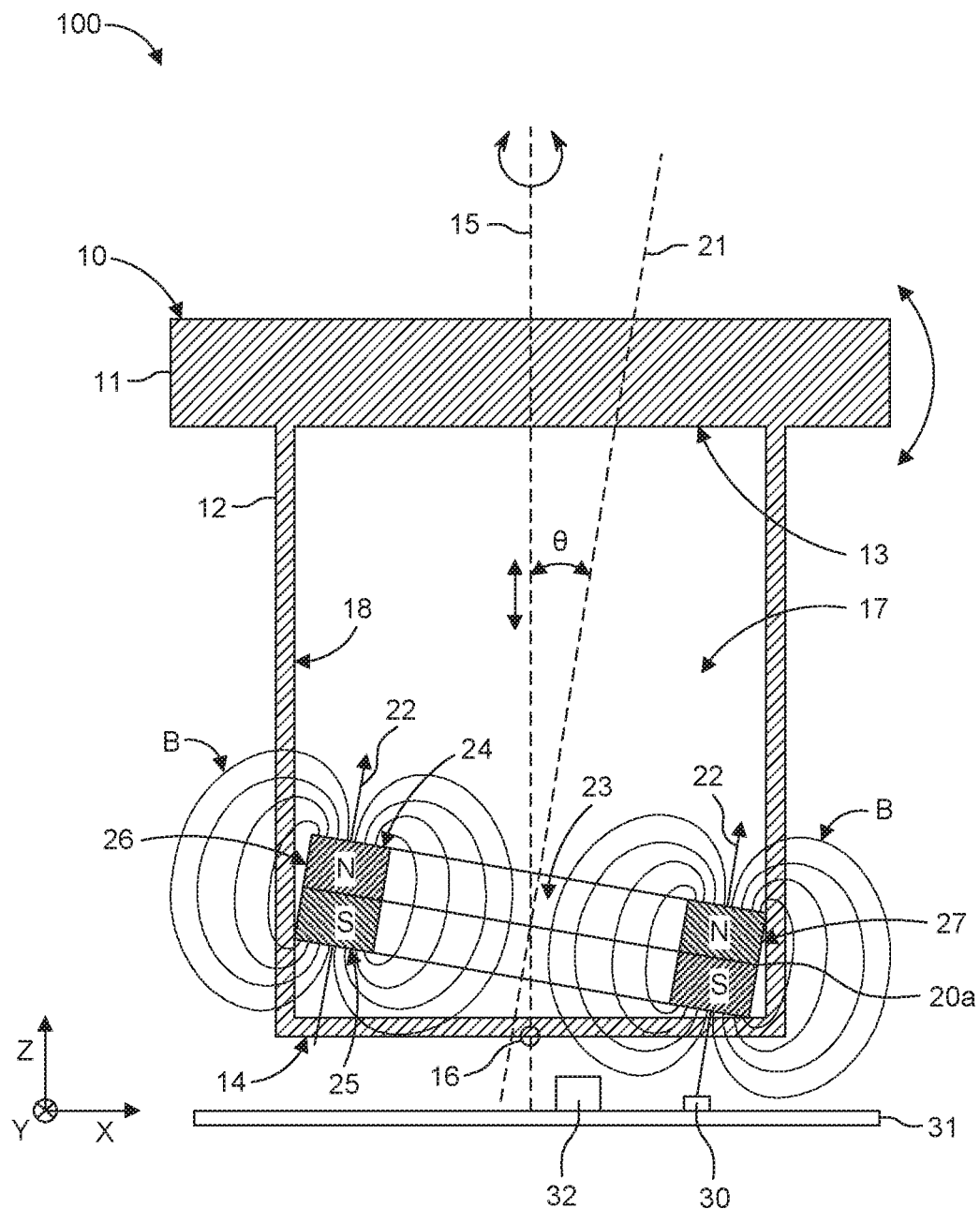
FIG. 1A is a cross-sectional view of a rotary knob sensor arrangement according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto. A sensor device, as described herein, may be an angle sensor, a speed sensor, a motion sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

It will be appreciated that the terms "sensor" and "sensing element" may be used interchangeably throughout this description, and the terms "sensor signal" and "measurement signal" may be used interchangeably throughout this description.

Magnetic sensors provided in the described embodiments include lateral and vertical Hall-effect sensors (Hall sensors). A Hall effect sensor is a transducer that varies its output voltage (Hall voltage) in response to a magnetic field. It is based on the Hall effect which makes use of the Lorentz force. The Lorentz force deflects moving charges in the presence of a magnetic field which is perpendicular to the current flow through the sensor or Hall plate. Thereby a Hall plate can be a thin piece of semiconductor or metal. The deflection causes a charge separation which causes a Hall electrical field. This electrical field acts on the charge in the opposite direction with regard to the Lorentz Force. Both forces balance each other and create a potential difference perpendicular to the direction of current flow. The potential difference can be measured as a Hall voltage and varies in a linear relationship with the magnetic field for small values. Hall effect sensors can be used for proximity switching, positioning, speed detection, and current sensing applications.

A vertical Hall sensor is a magnetic field sensor constructed with the Hall element perpendicular to the plane of the chip (e.g., extending from a main surface of the chip into the chip body). It senses magnetic fields perpendicular to its defined sensitive edge (top, right, or left, relative to the main surface of the chip). This generally means that a vertical Hall sensor is sensitive to a magnetic field component that extends parallel to their surface and parallel, or in-plane, to the main surface of the chip in which the vertical Hall sensor is integrated. In particular, a vertical Hall sensor may extend from the main surface into the chip. The plane of sensitivity may be referred to herein as a "sensitivity-axis" or "sensing axis" and each sensing axis has a reference direction. For vertical Hall sensor elements, voltage values output by the sensor elements change according to the magnetic field strength in the direction of its sensing axis.

On the other hand, a lateral (planar) Hall sensor is constructed with the Hall element in the same plane as the main surface of the chip. It senses magnetic fields perpendicular to its planar surface. This means they are sensitive to magnetic fields vertical, or out-of-plane, to the main surface of the chip. The plane of sensitivity may be referred to herein as a "sensitivity-axis" or "sensing axis" and each sensing axis has a reference direction. Similar to vertical Hall sensor elements, voltage values output by lateral Hall sensor elements change according to the magnetic field strength in the direction of its sensing axis.

A magnetic field component may be, for example, an x-magnetic field component (Bx), a y-magnetic field component (By), or a z-magnetic field component (Bz), where the Bx and By field components are in-plane to the chip, and Bz is out-of-plane to the chip in the examples provided.

According to one or more embodiments, a plurality of magnetic field angle sensors and a sensor circuitry may be both accommodated (i.e., integrated) in the same chip.

For example, a 3D magnetic sensor may include a first plurality of spinning vertical Hall plates that are configured to measure (i.e., sensitive to) the x-magnetic field component (Bx) and operate in spinning scheme (e.g., a current spinning scheme or a voltage spinning scheme), a second plurality of spinning vertical Hall plates that are configured to measure the y-magnetic field component (By) and operate in spinning scheme, and a third plurality of spinning lateral Hall plates that are configured to measure the z-magnetic field component (Bz) and operate in spinning scheme. Together, the three sets of Hall sensor elements perform magnetic field detection in the x, y, and z directions (i.e., all three dimensions of a magnetic field) and generate sensor signals allowing the 3D magnetic sensor to measure 3D linear and rotation movements.

The sensor circuit may be referred to as a signal processing circuit and/or a signal conditioning circuit that receives one or more signals (i.e., sensor signals) from one or more magnetic field sensor elements in the form of raw measurement data and derives, from the sensor signal, a measurement signal that represents the magnetic field.

In some cases, a measurement signal may be differential measurement signal that is derived from sensor signals generated by two sensor elements having a same sensing axis (e.g., two sensor elements sensitive to the same magnetic field component) using differential calculus. A differential measurement signal provides robustness to homogenous external stray magnetic fields.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal, to be discussed below. Therefore, a chip, which may also be referred to as an integrated circuit (IC), may include a circuit that conditions and amplifies the small signal of one or more magnetic field sensor elements via signal processing and/or conditioning.

A sensor device, as used herein, may refer to a device which includes a sensor and sensor circuit as described above. A sensor device may be integrated on a single semiconductor die (e.g., silicon die or chip). Thus, the sensor and the sensor circuit are disposed on the same semiconductor die.

Figure 1B:
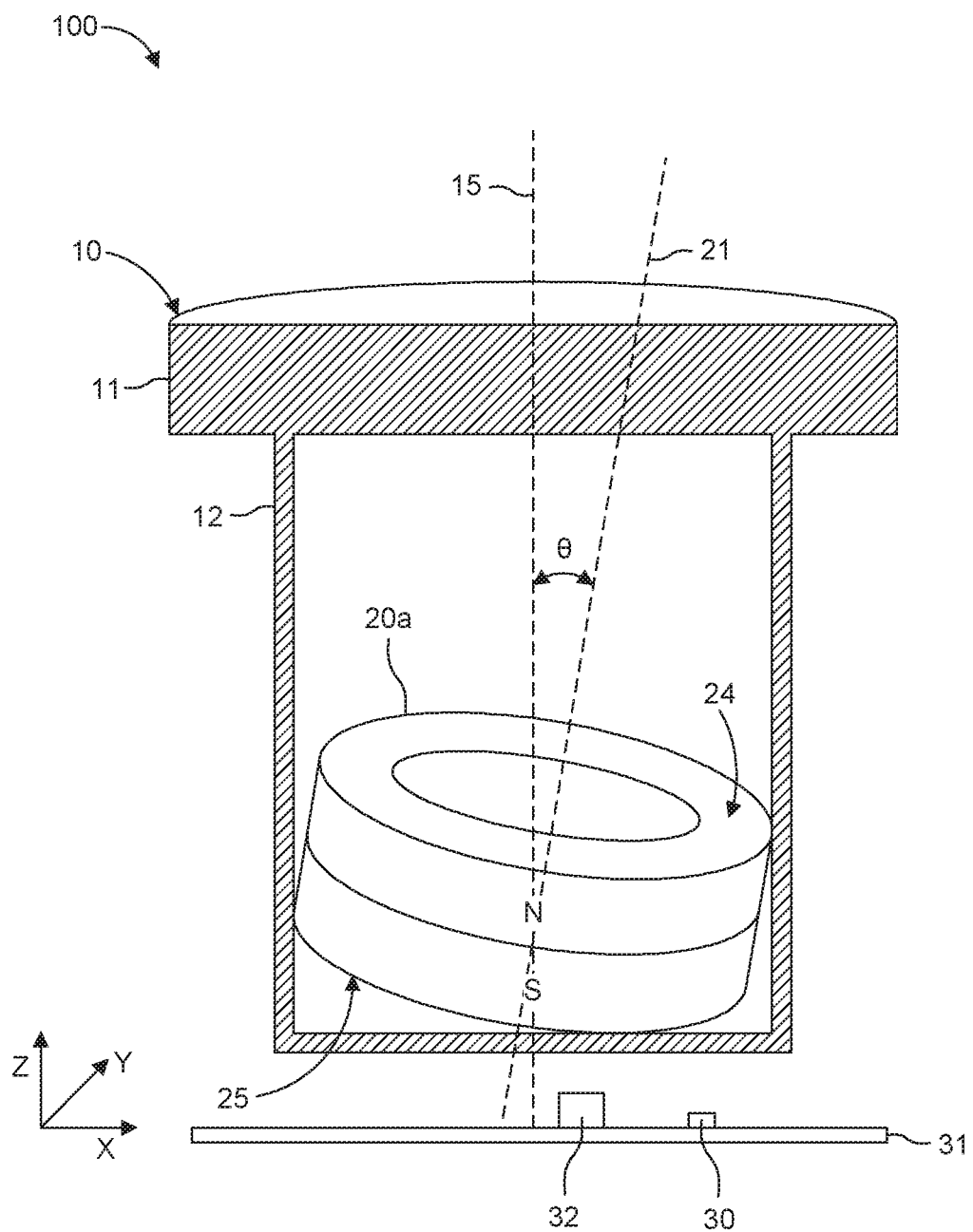
FIG. 1B is a perspective view of the rotary knob sensor arrangement of FIG. 1A according to one or more embodiments.

FIG. 1A is a cross-sectional view of a rotary knob sensor arrangement 100 according to one or more embodiments. FIG. 1B is a perspective view of the rotary knob sensor arrangement 100 according to one or more embodiments. The rotary knob sensor arrangement 100 includes a rotary knob 10, a magnet 20a, and a three-dimensional (3D) magnetic sensor 30. The rotary knob 10 includes a knob head 11 and a shaft 12 that is coupled to the knob head 11 at one of its ends 13 of two opposing ends 13 and 14.

The rotary knob 10 has a rotation axis 15 and is configured to rotate about the rotation axis 15 when a rotational force applied thereto. In addition to rotation, the rotary knob 10 may be configured to move spatially in at least one of three dimensions when a spatial force applied thereto. For example, the rotary knob 10 may move directionally along the x-axis, y-axis, and/or z-axis. The z-axis is parallel to and/or aligned with the rotation axis 15, whereas the x-axis and y-axis are orthogonal to the rotation axis 15.

The rotary knob 10, as shown in FIGS. 1A and 1B, is positioned in its default spatial position. That is, the rotary knob 10 is configured to rest in this position in the absence of any spatial force applied thereto. Accordingly, the rotary knob 10 may be displaced from this default spatial position when a spatial force in the x, y, and/or z direction is applied thereto. A spatial force in the z-direction may be a push or pull forces that causes axial movement of the rotary knob 10 along the rotation axis 15. A spatial force in the x-direction or y-direction may cause a pivoting movement of the rotary knob resulting in the rotary knob 10 to pivot on a pivot point 16 in the respective x- or y-direction. When the rotary knob 10 pivots from the default spatial position, the pivoting causes an angle between a rotation axis 15 and a magnetization vector of a magnet 20 to change. Thus, in general, the rotary knob 10 is configured to be displaced from the default spatial position to a displaced spatial position based on a spatial force applied to the rotary knob 10 that results in a displacement vector from the default spatial position to the displaced spatial position in Euclidean space.

For example, rotary knob 10 may be a control knob of a multimedia system. This could have the following advanced functionalities: rotation for volume control, push or pull for mute or power on/off, tilt in the y-direction (e.g., upwards or downwards) to change the current mode, radio station, or song played or navigate through various menus, and tilt in the x-direction (e.g., right or left) to change the current mode, radio station, or song played or navigate through various menus. As a result, each different movements of the rotary knob 10 can be programmed to correspond to different unique control functionalities.

The shaft 12 of the rotary knob 10 may be solid or may include a bore 17 that extends at least partially through the shaft 12. In this case, the bore 17 extends along the rotation axis 15 from the first end 13 to the second end 14. The bore 17 further defines an internal surface 18 of the shaft 12.

The magnet 20a is coupled to the shaft 12. In particular, in the case that the shaft 12 does not include the bore 17, the magnet 20a may be coupled to the second end 14, outside of the shaft 12, in a tilted orientation. Alternatively, if a bore 17 is provided, the magnet 20a may be arranged inside the bore 17 in a tilted orientation and fixedly coupled to the internal surface 18 of the shaft 12, as is the case shown in FIGS. 1A and 1B.

In either case, the magnet 20a undergoes a same movement as the rotary knob 10 when either a rotational or spatial force is applied to the rotary knob 10. As a result, the rotary knob 10 and the magnet 20a share the same rotational axis and the magnet 20a rotates about the rotation axis 15 as the rotary knob 10 rotates. In addition, the magnet 20a has a default spatial position, as positioned in FIGS. 1A and 1B, that corresponds to the default spatial position of the rotary knob 10. The rotary knob 10 and the magnet 20a share the same pivot point 16. Thus, the magnet 20a may move directionally along the x-axis, y-axis, and/or z-axis. In general, it can be said that the magnet 20a is configured to be displaced from the default spatial position to a displaced spatial position based on a spatial force applied to the rotary knob 10 that results in a displacement vector from the default spatial position to the displaced spatial position in Euclidean space.

The 3D magnetic sensor 30 is rotationally fixed (i.e., does not rotate) to a substrate 31, such a circuit substrate. The 3D magnetic sensor 30 is arranged with a magnetic field B produced by the magnet 20a. The 3D magnetic sensor 30 is also arranged a predetermined distance from the magnet 20a when the magnet 20a is in its default spatial position. That is to say, there exists a predetermined air gap between the 3D magnetic sensor 30 and the magnet 20a when the magnet 20a is in its default spatial position. This predetermined distance or predetermined air gap may change due to a spatial movement of the magnet 20a along any of the three spatial directions, x, y, and/or z.

The 3D magnetic sensor 30 is configured to measure three different magnetic field components of the magnetic field B and generate sensor signals in response to the measured three different magnetic field components. In particular, the 3D magnetic sensor 30 includes at least one first sensing element configured to measure a first magnetic field component Bx of the magnetic field B, at least one second sensing element configured to measure a second magnetic field component By of the magnetic field B, and at least one third sensing element configured to measure a third magnetic field component Bz of the magnetic field B, where the first magnetic field component Bx, the second magnetic field component By, and the third magnetic field component Bz are aligned in different orthogonal directions.

A processing circuit 32, electrically coupled to the 3D magnetic sensor 30, may be configured to receive the sensor signals and detect a rotational movement of the rotary knob about the rotation axis, an axial movement of the rotary knob along the rotation axis, and a pivoting movement of the rotary knob that causes the rotary knob to pivot on a pivot point 16.

Starting with FIGS. 1A and 1B, various configurations of a magnet will now be discussed. Magnet includes magnet 20a, 20b, 20c, and 20d and may collectively be referred to as magnet 20. However, in each configuration, the magnetic field B produced by magnet 20 varies inhomogeneously at the 3D magnetic sensor 30 with regards to at least one of the three magnetic field components while the magnet 20 rotates about the rotation axis 15. More specifically, in each configuration, the magnetic field B varies (i.e., rotates) inhomogeneously at the 3D magnetic sensor 30 while the magnet 20 rotates about the rotation axis while the magnet 20 is in its default spatial position.

In FIGS. 1A and 1B, the magnet 20a includes a first pole N (e.g., a north pole) and a second pole S (e.g., a south pole) having an opposite polarity to the first pole. The magnet 20a also includes a symmetry axis 21 and has structural symmetry about the symmetry axis 21. For example, the magnet 20a may be a disc magnet, a cylinder magnet, a ring magnet, a cube magnet, and the like. The magnet 20a shown in FIGS.

1A and 1B is a ring magnet, but is not limited thereto. Thus, the magnet 20a further incudes a cavity 23 that extends along the symmetry axis 21 from the first face 24 to the second face 25. The magnet 20a is also axially magnetized along a magnetization direction that extends through the thickness of the magnet 20a such that the north and south poles are located on opposite faces 24 and 25 of the magnet 20a. The magnetic 20 is also homogenously magnetized. Thus, the magnetization vectors 22 of the magnet 20a are equal in magnitude and have a magnetization direction that is parallel to the symmetry axis 21.

The cross-section of the magnet 20a includes a first side 26 and a second side 27 arranged opposite to the first side 26. Because the magnet 20a is homogenously magnetized, the strength of the magnetic field B produced by the magnet 20a is uniform from the first side 26 to the second side 27 and all magnetization vectors 22 point in the same magnetization direction.

The magnetization vector 22, when projected onto the rotation axis 15, is displaced from the rotation axis 15 by a default displacement angle θ that is greater than zero when the magnet 20a is in the default spatial position. In other words, the symmetry axis 21 of the magnet 20a is tilted with respect to the rotation axis 15 when the magnet 20a is in the default spatial position. Specifically, the symmetry axis 21 intersects with the rotation axis 15 and is displaced from the rotation axis 15 by the default displacement angle θ when the magnet 20a is in its default spatial position.

As a result, the magnetic field B varies (e.g., rotates) inhomogeneously at the 3D magnetic sensor while the magnet 20a rotates about the rotation axis 15. The inhomogeneous variation of the magnetic field B occurs at the 3D magnetic sensor 30 while the magnet 20a rotates in its default spatial position and while it rotates in a displaced spatial position.

According to this arrangement, the tilted axially magnetized magnet 20a can be used to detect rotation as well as spatial movements in three axis. The default displacement angle θ leads to higher magnetic field changes measured by the 3D magnetic sensor 30 when compared to a case where the default displacement angle θ is equal to zero. Instead, as shown in FIG. 2, the non-zero default displacement angle θ leads to a higher variation of the magnet-to-sensor airgap within one rotation.

Figure 2:
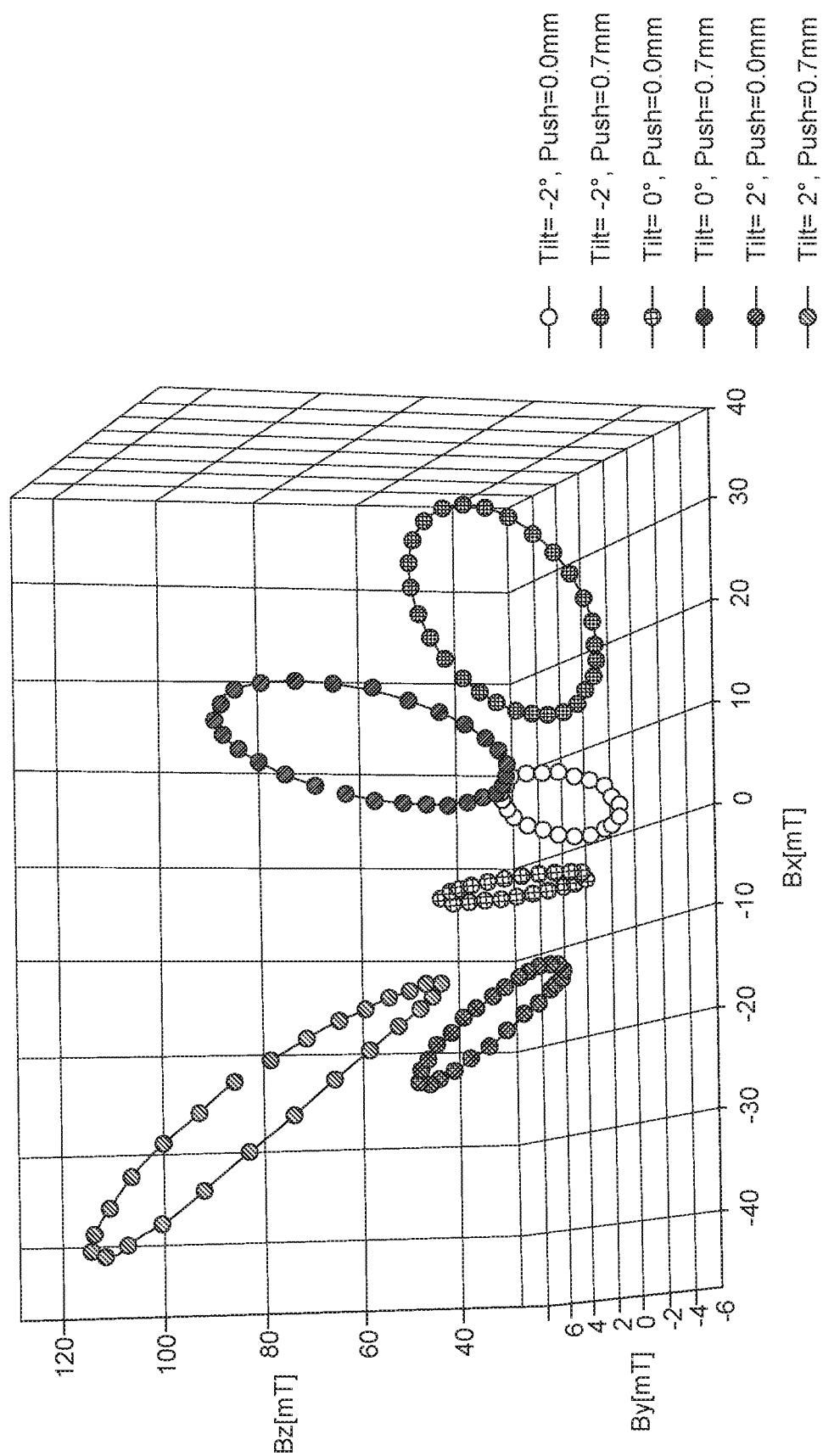
FIG. 2 shows sensor measurements obtained by a 3D magnetic sensor during a full rotation of a magnet about a rotation axis according to a default displacement angle according to one or more embodiments.

Specifically, FIG. 2 shows sensor measurements obtained by the 3D magnetic sensor 30 during a full rotation of the magnet 20a about the rotation axis 15 according to a default displacement angle θ of 5°. Measurements are shown with an additional tilt displacement applied to the magnet 20a at −2° and 2° from the default displacement angle θ of 5° (i.e., the symmetry axis 21 is tilted at 3° and 7°, respectively, with respect to the rotation axis 15), as well as with no additional tilt displacement applied to the magnet 20a (i.e., the symmetry axis 21 is tilted at 5° with respect to the rotation axis 15). Additionally, for each tilt angle θ, a rotational measurement is shown as being taken while the magnet 20a is rotating in a displaced spatial position at which the magnet 20a is displaced along the rotation axis 15 (i.e., in the z-direction) by being pushed downward closer to the 3D magnetic sensor 30 by 0.7 mm. As such, a measurement corresponding to an additional tilt of 0° and a push of 0.0 mm corresponds to a full rotation at the default displacement position.

The rotation of the magnet 20a is moving on an elliptical-shaped curve for the measurement results. This allows for an analytic (arctan) based evaluation by the processing circuit 32 to determine the unambiguous rotation angle of the magnet 20a. A push along the rotation axis 15 generally increases the magnetic field strength, as the magnet 20a is moved closer to the 3D magnetic sensor 30, whereas a pull along the rotation axis 15 generally decreases the magnetic field strength. A tilt of the knob mainly causes a side displacement of the magnet 20a, which result in a different magnetic vector angle measured by the 3D magnetic sensor 30. One benefit of the embodiments is that very small knob tilts and side displacements can be detected. Thus, all possible positions of the magnet 20a have a unique measurement result and can therefore be unambiguously be detected by the processing circuit 32.

As a result, the 3D magnetic sensor 30 is capable of detecting rotational movement of the magnetic field B as well as small spatial movements (<<1 mm) of the magnetic field B due to the fast changing gradients of the magnetic field vector at the sensor element positions. The use of a slightly tilted axially magnetized ring magnet thereby enables a mechanically simple position detection of a complex movement that includes rotation, push, pull, and tilt.

The center space created by the bore 17 and the cavity 23 may also be used to place additional functionality, such as a light emitting diode (LED) for illumination of the knob head 11.

Figure 3:
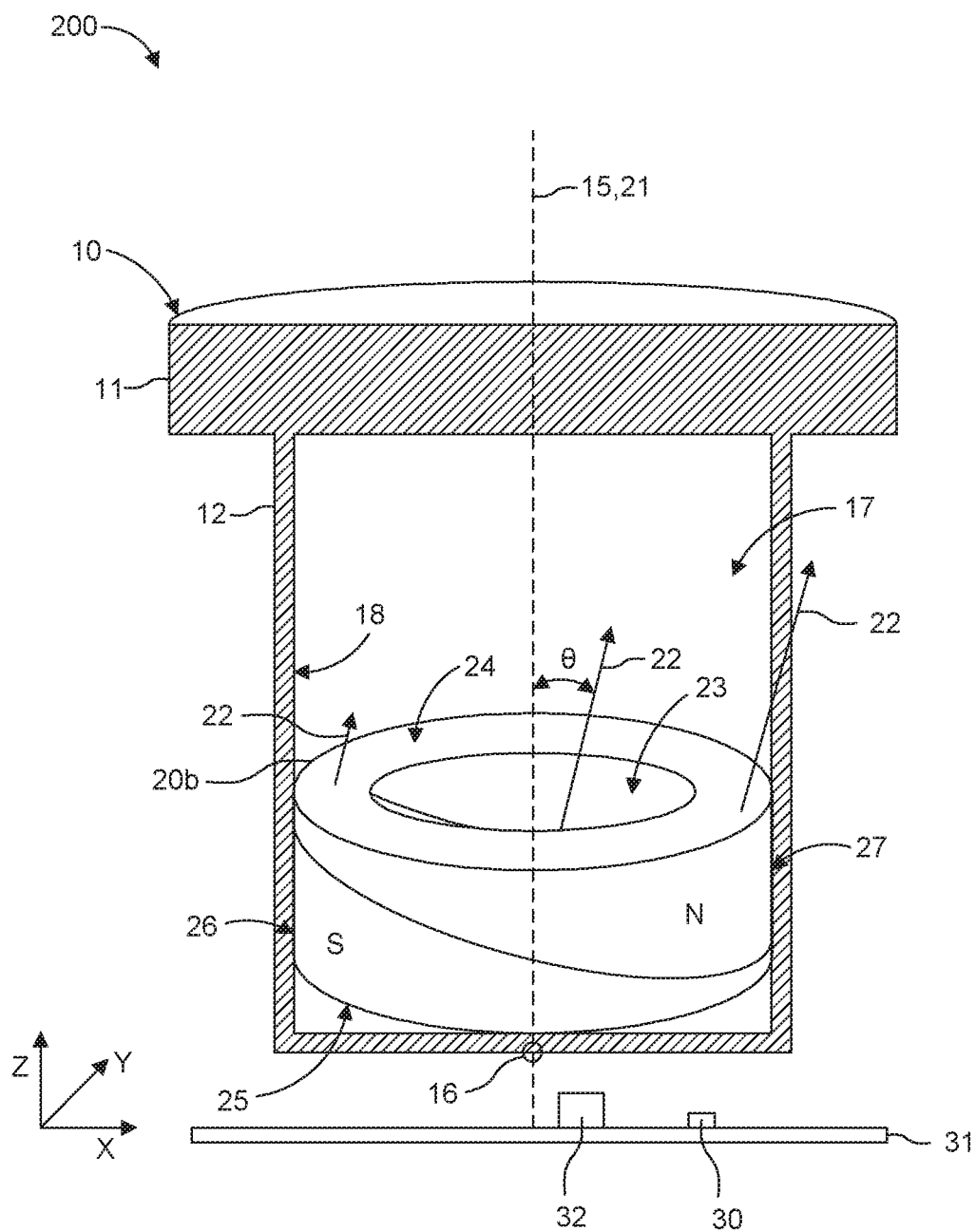
FIG. 3 is a perspective view of another rotary knob sensor arrangement according to one or more embodiments.

FIG. 3 is a perspective view of a rotary knob sensor arrangement 200 according to one or more embodiments. The rotary knob sensor arrangement 200 is similar to the rotary knob sensor arrangement 100 with the exception of the configuration of magnet 20. In FIG. 3, magnet 20b is used instead of magnet 20a.

Magnet 20b is inhomogenously magnetized such that its magnetization vectors 22 are tilted with respect to both the rotation axis 15 and the magnet's symmetry axis 21 when the magnet 20b is in its default spatial position. It can be further appreciated that the magnet's symmetry axis 21 is parallel to the rotation 15 and, more particularly, is aligned with the rotation axis 15 when the magnet 20b is in its default spatial position. As a result, the orientation of the magnet 20b itself need not be oriented in a tilted orientation when coupled to the rotary knob 10 inside or outside of the bore 17.

Like magnet 20a, magnet 20b includes a first pole N (e.g., a north pole) and a second pole S (e.g., a south pole) having an opposite polarity to the first pole. The first pole N and the second pole S may form the first face 24 and second face 25 of the magnet 20b, respectively. The magnet 20b also includes a symmetry axis 21 and has structural symmetry about the symmetry axis 21. For example, the magnet 20b may be a disc magnet, a cylinder magnet, a ring magnet, a cube magnet, and the like. The magnet 20b shown in FIG. 3 is a ring magnet, but is not limited thereto. Thus, the magnet 20b further incudes a cavity 23 that extends along the symmetry axis 21 from the first face 24 to the second face 25.

A cross-section of the magnet 20b includes a first side 26 and a second side 27 arranged opposite to the first side 26. The south pole S and the north pole N are coupled together at an interface that extends from the first side 26 to the second side 27. A thickness of the north pole N increases from the first side 26 to the second side 27 and, conversely, a thickness of the south pole S decreases from the first side 26 to the second side 27. As a result, the field strength of the magnetic field B produced by the magnet 20b (i.e., the length of the magnetic field vectors 22) increases from the first side 26 to the second side 27. The field strength may vary in a linear manner from one side to the other side of the magnet 20b. Thus, the magnetization vectors 22 of the magnet 20b vary in magnitude and have a magnetization direction that is titled from the symmetry axis 21 by the default displacement angle θ.

The magnet 20b is arranged such that the magnetization vectors 22, when projected onto the rotation axis 15, are displaced from the rotation axis 15 by the default displacement angle θ that is greater than zero when the magnet 20b is in a default spatial position. The magnet 20b is configured to be displaced from the default spatial position to a displaced spatial position based on an applied spatial force that results in a displacement vector from the default spatial position to the displaced spatial position in Euclidean space. As a result, the magnetic field B varies inhomogeneously at the 3D magnetic sensor 30 while the magnet 20b rotates about the rotation axis 15 in at least the default spatial position. Thus, the same benefits described above for the rotary knob sensor arrangement 100 can be similarly achieved in this arrangement.

Figure 4:
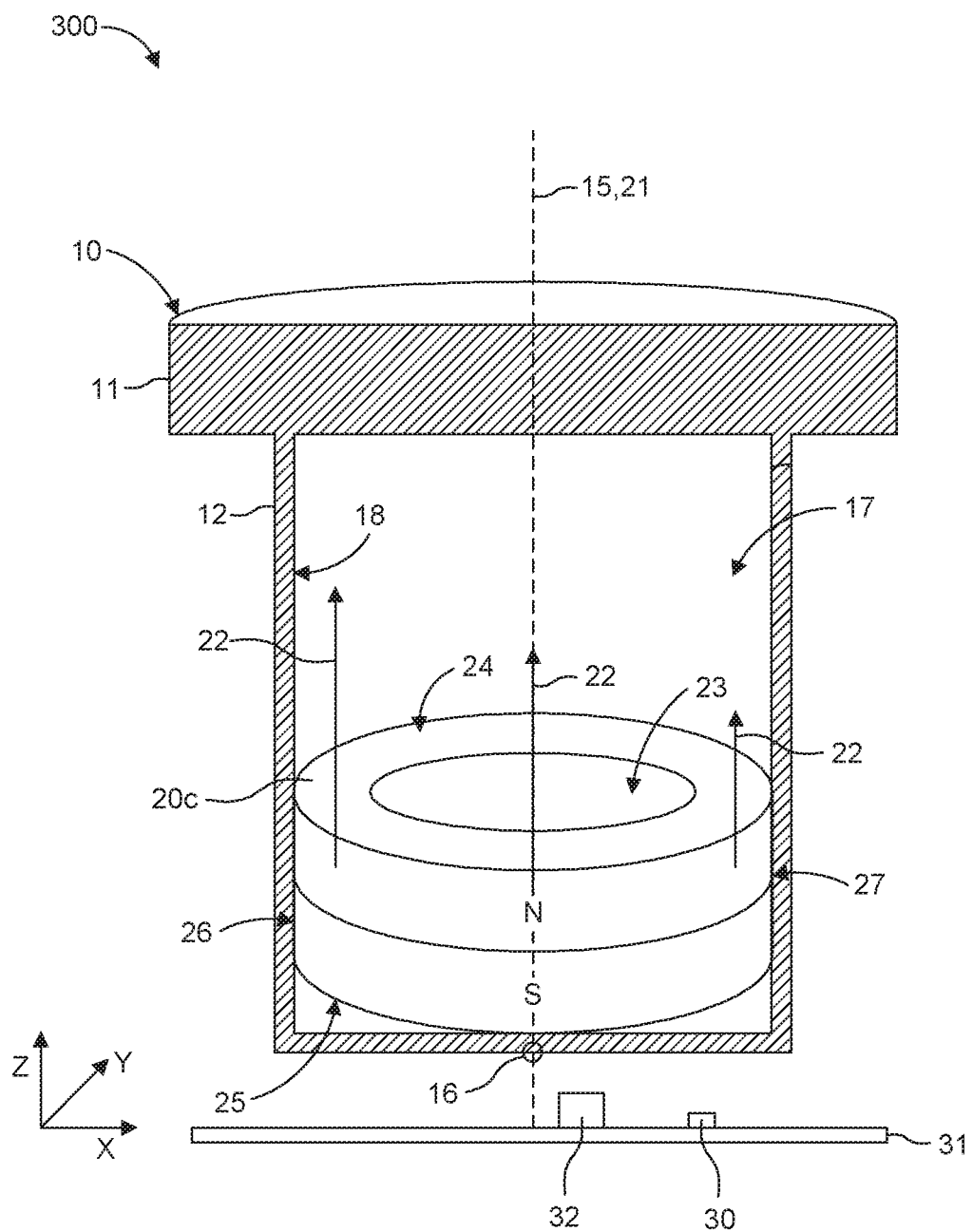
FIG. 4 is a perspective view of another rotary knob sensor arrangement according to one or more embodiments.

FIG. 4 is a perspective view of a rotary knob sensor arrangement 300 according to one or more embodiments. The rotary knob sensor arrangement 300 is similar to the rotary knob sensor arrangements 100 and 200 with the exception of the configuration of magnet 20. In FIG. 4, magnet 20c is used instead of magnets 20a and 20b.

Magnet 20c is inhomogenously magnetized. The magnet 20c is also axially magnetized. In this case, its magnetization vectors 22 are parallel to the rotation axis 15 when the magnet 20c is in its default spatial position. However, the field strength of the magnetic field produced by the magnet 20c (i.e., the length of the magnetization vectors 22) varies such that it decreases from the first side 26 to the second side 27. The change in field strength may be linear across the magnet 20c. In this arrangement, the magnetization vectors 22 are parallel to both the rotation axis 15 and the magnet's symmetry axis 21 when the magnet 20c is in its default spatial position. It can be further appreciated that the magnet's symmetry axis 21 is parallel to the rotation 15 and, more particularly, may be aligned with the rotation axis 15 when in its default spatial position. As a result, the orientation of the magnet 20c itself need not be oriented in a tilted orientation when coupled to the rotary knob 10 inside or outside of the bore 17.

Like magnets 20a and 20b, magnet 20c includes a first pole N (e.g., a north pole) and a second pole S (e.g., a south pole) having an opposite polarity to the first pole. The first pole N and the second pole S may form the first face 24 and second face 25 of the magnet 20c, respectively. The magnet 20c also includes a symmetry axis 21 and has structural symmetry about the symmetry axis 21. For example, the magnet 20c may be a disc magnet, a cylinder magnet, a ring magnet, a cube magnet, and the like. The magnet 20c shown in FIG. 4 is a ring magnet, but is not limited thereto. Thus, the magnet 20c further incudes a cavity 23 that extends along the symmetry axis 21 from the first face 24 to the second face 25.

A cross-section of the magnet 20c includes the first side 26 and the second side 27 arranged opposite to the first side 26. The south pole S and the north pole N are coupled together at an interface that extends from the first side 26 to the second side 27. A thicknesses of the north pole N and south pole S are constant from the first side 26 to the second side 27, but each pole is inhomogenously magnetized across the magnet 20c. As a result, the field strength of the magnetic field B produced by the magnet 20c (i.e., the length of the magnetic field vectors 22) decreases from the first side 26 to the second side 27. The field strength may vary in a linear manner from one side to the other side of the magnet 20c.

Thus, the magnetization vectors 22 of the magnet 20b vary in magnitude and have a magnetization direction that is parallel to the symmetry axis 21.

The magnet 20c is arranged such that the magnetization vectors 22, when projected onto the rotation axis 15, are aligned with the rotation axis 15 when the magnet 20c is in its default spatial position. The magnet 20c is configured to be displaced from the default spatial position to a displaced spatial position based on an applied spatial force that results in a displacement vector from the default spatial position to the displaced spatial position in Euclidean space. As a result, the magnetic field B varies inhomogeneously at the 3D magnetic sensor 30 while the magnet 20c rotates about the rotation axis 15 in at least the default spatial position. Thus, the same benefits described above for the rotary knob sensor arrangement 100 can be similarly achieved in this arrangement.

Figure 5:
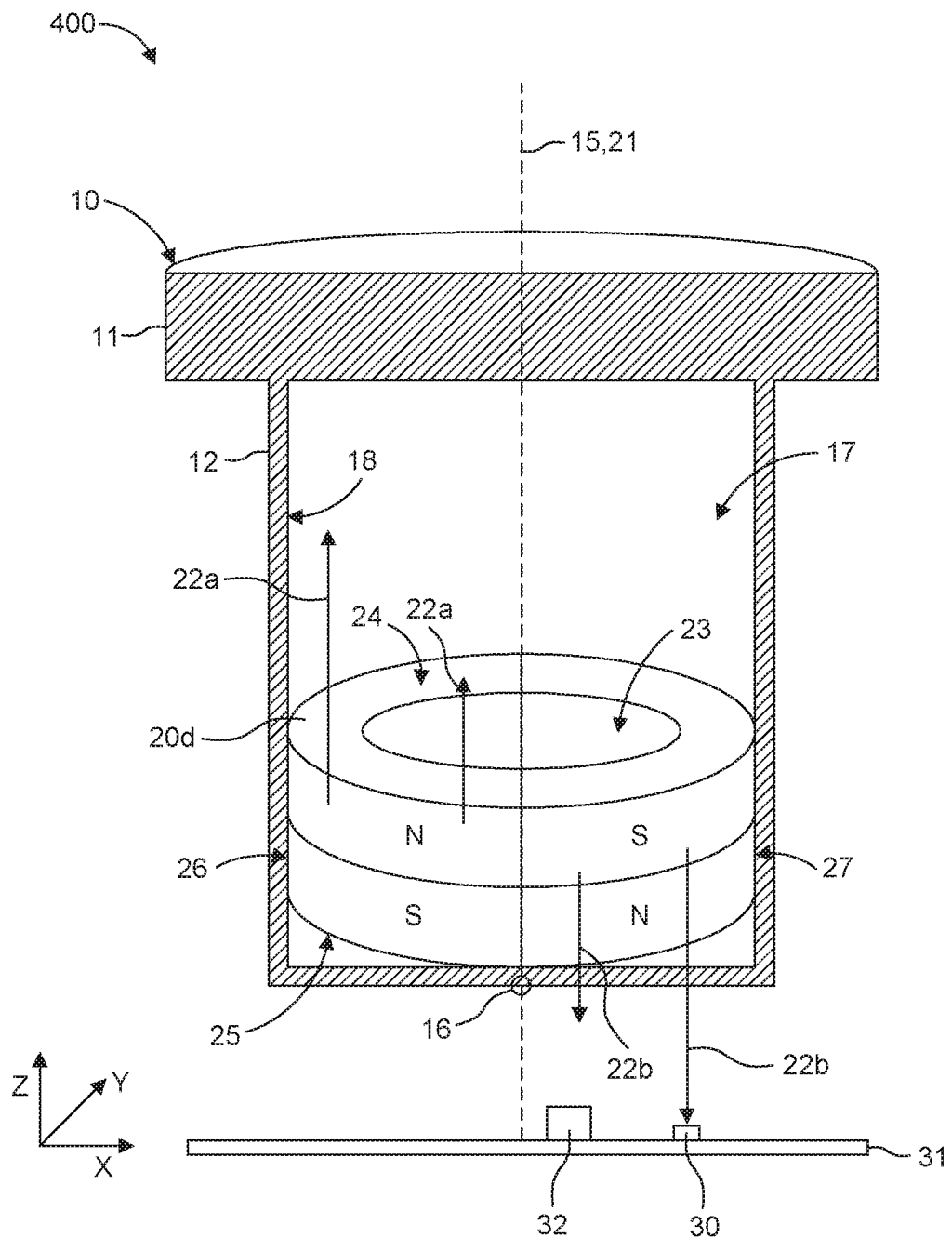
FIG. 5 is a perspective view of another rotary knob sensor arrangement according to one or more embodiments.

FIG. 5 is a perspective view of a rotary knob sensor arrangement 400 according to one or more embodiments. The rotary knob sensor arrangement 400 is similar to the rotary knob sensor arrangements 100, 200, and 300 with the exception of the configuration of magnet 20. In FIG. 4, magnet 20d is used instead of magnets 20a, 20b, and 20c.

Magnet 20d is inhomogenously magnetized. The magnet 20d is also axially magnetized. In this case, its magnetization vectors 22 are parallel to the rotation axis 15 when the magnet 20d is in its default spatial position. However, the field strength and the direction of the magnetic field produced by the magnet 20d (i.e., the length of the magnetization vectors 22) varies inhomogeneously.

The magnet 20d itself is symmetrical to a symmetry axis 21 that is parallel to the rotation axis 15 when the magnet 20c is in its default spatial position. More particularly, the symmetry axis 21 may be aligned with the rotation axis 15 when in its default spatial position. As a result, the orientation of the magnet 20d itself need not be oriented in a tilted orientation when coupled to the rotary knob 10 inside or outside of the bore 17.

The magnet 20d includes first poles N (e.g., a north pole) and second poles S (e.g., a south pole) having an opposite polarity to the first poles. A first one of the first poles N and a first one of the second poles S may form the first face 24. A second one of the first poles N and a second one of the second poles S may form the second face 25. The magnet 20d may be a disc magnet, a cylinder magnet, a ring magnet, a cube magnet, and the like. The magnet 20d shown in FIG. 5 is a ring magnet, but is not limited thereto. Thus, the magnet 20d further incudes a cavity 23 that extends along the symmetry axis 21 from the first face 24 to the second face 25.

A cross-section of the magnet 20d includes first portion (e.g., a left half) that extends from the first side 26 to the symmetry axis 21 and a second portion (e.g., a right half) that extends from the second side 27 to the symmetry axis 21. The magnet 20d has a first plurality of magnetization vectors 22a that are parallel to the rotation axis 15 when the magnet 20 is in the default spatial position. The first plurality of magnetization vectors 22a are produced in the first portion of the magnet 20d.

The magnet 20d further includes a second plurality of magnetization vectors 22b that are parallel to the rotation axis 15 when the magnet 20d is in the default spatial position. The second plurality of magnetization vectors 22b are produced in the second portion of the magnet 20d and are antiparallel to the first plurality of magnetization vectors 22a. Thus, poles of the magnet 20d are arranged such that the first plurality of magnetization vectors 22a and the second plurality of magnetization vectors 22b have opposite directions. In addition, a field strength of the magnetic field B produced by the magnet 20d increases from the symmetry axis 21 to the first side 26 and increases from the symmetry axis 21 to the second side 27. Thus, a length of the first plurality of magnetization vectors 22a increase from the symmetry axis 21 to the first side 26 and a length of the second plurality of magnetization vectors 22b increase from the symmetry axis 21 to the second side 27. The field strength of the magnetic field B in the first and the second portions of the magnet 20d may change with respect to each other in equal but opposite magnitudes as a distance from the symmetry axis 21 increases. The field strength may vary in a linear manner in each respective portion of the magnet 20d.

The magnet 20d is arranged such that the magnetization vectors 22a and 22b, when projected onto the rotation axis 15, are aligned with the rotation axis 15 when the magnet 20d is in its default spatial position. The magnet 20d is configured to be displaced from the default spatial position to a displaced spatial position based on an applied spatial force that results in a displacement vector from the default spatial position to the displaced spatial position in Euclidean space. As a result, the magnetic field B varies inhomogeneously at the 3D magnetic sensor 30 while the magnet 20d rotates about the rotation axis 15 in at least the default spatial position. Thus, the same benefits described above for the rotary knob sensor arrangement 100 can be similarly achieved in this arrangement.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A magnetic sensor device, comprising:
 a three-dimensional (3D) magnetic sensor arranged within a magnetic field, the 3D magnetic sensor being configured to measure three different magnetic field components of the magnetic field and generate sensor signals in response to the measured three different magnetic field components; and
 a magnet that produces the magnetic field, wherein the magnet is arranged in a default spatial position in an absence of any applied spatial force, wherein the magnet is configured to rotate about a rotation axis based on an applied rotational force, and wherein the magnetic field varies inhomogeneously with regards to at least one of the three magnetic field components upon rotation of the magnet about the rotation axis,
 wherein the magnetic field varies inhomogeneously at the 3D magnetic sensor while the magnet rotates about the rotation axis in the default spatial position,
 wherein a cross-section of the magnet includes a top side provided in a first plane, a bottom side provided in a second plane and arranged opposite to the top side, a first side, and a second side arranged opposite to the first side,
 wherein the magnet includes a first pole stacked onto a second pole, wherein the first pole delineates the top side of the magnet and the second pole delineates the bottom side of the magnet, wherein the rotation axis bisects the first plane and the second plane, and
wherein the first side and the second side are arranged radially from the rotation axis.

2. The magnetic sensor device of claim 1, wherein the magnet is configured to be displaced from the default spatial position to a displaced spatial position based on an applied spatial force that results in a displacement vector from the default spatial position to the displaced spatial position in Euclidean space.

3. The magnetic sensor device of claim 1, wherein the magnet has a magnetization vector that, when projected onto the rotation axis, is displaced from the rotation axis by a default displacement angle that is greater than zero when the magnet is in the default spatial position.

4. The magnetic sensor device of claim 3, wherein:
the magnet is symmetrical to a symmetry axis that symmetry axis that bisects the first plane and the second plane, wherein the symmetry axis is displaced from the rotation axis by the default displacement angle that is greater than zero when the magnet is in a default spatial position.

5. The magnetic sensor device of claim 4, wherein the rotation axis intersects with the symmetry axis.

6. The magnetic sensor device of claim 4, wherein:
the magnet is axially magnetized along the magnetization vector, and
the symmetry axis is parallel to the magnetization vector.

7. The magnetic sensor device of claim 3, wherein:
the magnet is symmetrical to a symmetry axis that is parallel to the rotation axis when the magnet is in a default spatial position.

8. The magnetic sensor device of claim 7, wherein the rotation axis is aligned with the symmetry axis.

9. The magnetic sensor device of claim 7, wherein:
a strength of the magnetic field produced by the magnet increases from the first side to the second side.

10. The magnetic sensor device of claim 9, wherein:
the south pole and the north pole are coupled together at an interface that extends from the first side to the second side,
a thickness of the north pole increases from the first side to the second side, and
a thickness of the south pole decreases from the first side to the second side.

11. The magnetic sensor device of claim 1, wherein:
the magnet has a plurality of magnetization vectors that are parallel to the rotation axis when the magnet is in the default spatial position, and
a strength of the magnetic field produced by the magnet decreases from the first side to the second side.

12. The magnetic sensor device of claim 1, further comprising:
a processing circuit configured to receive the sensor signals and detect a rotational movement of the magnet about the rotation axis, an axial movement of the magnet along the rotation axis, and a pivoting movement of the magnet that causes an angle between the rotation axis and a magnetization vector of the magnet to change.

13. The magnetic sensor device of claim 1, wherein:
the magnet is symmetrical to a symmetry axis that bisects the first plane and the second plane, and
the magnet incudes a cavity that extends along the symmetry axis from the top side to the bottom side.

14. The magnetic sensor device of claim 1, wherein the 3D magnetic sensor is rotationally fixed.

15. The magnetic sensor device of claim 1, further comprising:
a rotary knob comprising a shaft configured to rotate about the rotation axis, wherein the shaft comprises a bore that extends at least partially through the shaft,
wherein the magnet is arranged inside the bore and fixedly coupled to an internal surface of the shaft defined by the bore.

16. The magnetic sensor device of claim 15, wherein the rotary knob is configured to pivot from the rotation axis and is configured to be displaced along the rotation axis.

17. The magnetic sensor device of claim 1, wherein while the magnet rotates about the rotation axis in the default spatial position, the spatial area that the magnetic occupies in Euclidean space does not change.

18. The magnetic sensor device of claim 1, wherein:
the magnet is configured to pivot about at least one pivot axis in the response to an applied spatial force to thereby change the spatial orientation of the magnet, wherein each pivot axis is orthogonal to the rotation axis, and
applying the rotational force to the magnet with respect to the rotation axis to cause a rotation thereabout does not cause a change in the spatial orientation of the magnet.

19. The magnetic sensor device of claim 9, wherein the strength of the magnetic field produced by the magnet gradually and continuously increases from the first side to the second side.

20. The magnetic sensor device of claim 1, wherein:
the south pole and the north pole are coupled together at an interface that extends from the first side to the second side,
a thickness of the north pole increases from the first side to the second side, and
a thickness of the south pole decreases from the first side to the second side.

21. The magnetic sensor device of claim 1, wherein:
the magnet is arranged over the 3D magnetic sensor, and
the 3D magnetic sensor is laterally offset from the rotation axis by a gap when the magnet is in the default spatial position.

22. A magnetic sensor device, comprising:
a three-dimensional (3D) magnetic sensor arranged within a magnetic field, the 3D magnetic sensor being configured to measure three different magnetic field components of the magnetic field and generate sensor signals in response to the measured three different magnetic field components; and
a magnet that produces the magnetic field, wherein the magnet is arranged in a default spatial position in an absence of any applied spatial force, wherein the magnet is configured to rotate about a rotation axis based on an applied rotational force, and wherein the magnetic field varies inhomogeneously with regards to at least one of the three magnetic field components upon rotation of the magnet about the rotation axis, wherein:
the magnet is symmetrical to a symmetry axis that is parallel to the rotation axis when the magnet is in a default spatial position,
a cross-section of the magnet includes first portion that extends from a first side to the symmetry axis and a second portion that extends from a second side to the symmetry axis, wherein the second side is arranged opposite to the first side,
the magnet has a first plurality of magnetization vectors that are parallel to the rotation axis when the magnet is in the default spatial position, wherein the first plurality of magnetization vectors are produced in the first portion of the magnet, the magnet has a second plurality of magnetization vectors that are parallel to the rotation axis when the magnet is in the default spatial position, wherein the second plurality of magnetization vectors are produced in the second portion of the magnet and are antiparallel to the first plurality of magnetization vectors, a strength of the magnetic field produced by the magnet increases from the symmetry axis to the first side and increases from the symmetry axis to the second side.

23. A rotary knob sensor arrangement, comprising:
a rotary knob comprising a shaft configured to rotate about a rotation axis;
a three-dimensional (3D) magnetic sensor arranged within a magnetic field, the 3D magnetic sensor being configured to measure three different magnetic field components of the magnetic field and generate sensor signals in response to the measured three different magnetic field components; and
a magnet coupled to the shaft, wherein the magnet produces the magnetic field,
wherein the magnet is arranged in a default spatial position in an absence of any spatial force applied to the rotary knob,
wherein the magnet is configured to rotate about a rotation axis based on a rotational force applied to the rotary knob, and
wherein the magnetic field varies inhomogeneously at the 3D magnetic sensor with regards to at least one of the three magnetic field components while the magnet rotates about the rotation axis,
wherein the magnetic field varies inhomogeneously at the 3D magnetic sensor while the magnet rotates about the rotation axis in the default spatial position,
wherein a cross-section of the magnet includes a top side provided in a first plane, a bottom side provided in a second plane and arranged opposite to the top side, a first side, and a second side arranged opposite to the first side,
wherein the magnet includes a first pole stacked onto second pole, wherein the first pole delineates the top side of the magnet and the second pole delineates the bottom side of the magnet,
wherein the rotation axis bisects the first plane and the second plane, and
wherein the first side and the second side are arranged radially from the rotation axis.

24. The rotary knob sensor arrangement of claim 23, wherein:
the shaft comprises a bore that extends at least partially through the shaft, wherein the bore defines an internal surface of the shaft, and
the magnet is arranged inside the bore and fixedly coupled to the internal surface of the shaft defined by the bore.

25. The rotary knob sensor arrangement of claim 23, further comprising:
a processing circuit configured to receive the sensor signals and detect a rotational movement of the rotary knob about the rotation axis, an axial movement of the rotary knob along the rotation axis, and a pivoting movement of the rotary knob that causes the rotary knob to pivot on a pivoting point from the rotation axis.

26. The rotary knob sensor arrangement of claim 23, wherein the magnet is configured to be displaced from the default spatial position to a displaced spatial position based on a spatial force applied to the rotary knob that results in a displacement vector from the default spatial position to the displaced spatial position in Euclidean space.

27. The rotary knob sensor arrangement of claim 23, wherein the magnet has a magnetization vector that, when projected onto the rotation axis, is displaced from the rotation axis by a default displacement angle that is greater than zero when the magnet is in the default spatial position.

28. The rotary knob sensor arrangement of claim 23, wherein:
the magnet has a plurality of magnetization vectors that are parallel to the rotation axis when the magnet is in the default spatial position, and
a strength of the magnetic field produced by the magnet decreases from the first side to the second side.

29. A rotary knob sensor arrangement, comprising:
a rotary knob comprising a shaft configured to rotate about a rotation axis;
a three-dimensional (3D) magnetic sensor arranged within a magnetic field, the 3D magnetic sensor being configured to measure three different magnetic field components of the magnetic field and generate sensor signals in response to the measured three different magnetic field components; and
a magnet coupled to the shaft, wherein the magnet produces the magnetic field,
wherein the magnet is arranged in a default spatial position in an absence of any spatial force applied to the rotary knob,
wherein the magnet is configured to rotate about a rotation axis based on a rotational force applied to the rotary knob, and
wherein the magnetic field varies inhomogeneously at the 3D magnetic sensor with regards to at least one of the three magnetic field components while the magnet rotates about the rotation axis, wherein:
the magnet is symmetrical to a symmetry axis that is parallel to the rotation axis when the magnet is in a default spatial position,
a cross-section of the magnet includes first portion that extends from a first side to the symmetry axis and a second portion that extends from a second side to the symmetry axis, wherein the second side is arranged opposite to the first side,
the magnet has a first plurality of magnetization vectors that are parallel to the rotation axis when the magnet is in the default spatial position, wherein the first plurality of magnetization vectors are produced in the first portion of the magnet,
the magnet has a second plurality of magnetization vectors that are parallel to the rotation axis when the magnet is in the default spatial position, wherein the second plurality of magnetization vectors are produced in the second portion of the magnet and are antiparallel to the first plurality of magnetization vectors,
a strength of the magnetic field produced by the magnet increases from the symmetry axis to the first side and increases from the symmetry axis to the second side.

* * * * *